Nov. 6, 1956  W. L. GOODLAD  2,769,294
PEA HARVESTER
Filed July 10, 1952  7 Sheets-Sheet 1

INVENTOR.
WILLIAM L. GOODLAD
BY
*Paul, Moore & Rugger*
ATTORNEYS

FIG. 3

INVENTOR.
WILLIAM L. GOODLAD

Nov. 6, 1956 W. L. GOODLAD 2,769,294
PEA HARVESTER
Filed July 10, 1952 7 Sheets-Sheet 4

INVENTOR.
WILLIAM L. GOODLAD
BY
*Paul, Moore & Dugger*
ATTORNEYS

Nov. 6, 1956  W. L. GOODLAD  2,769,294
PEA HARVESTER

Filed July 10, 1952  7 Sheets-Sheet 5

INVENTOR.
WILLIAM L. GOODLAD
BY
ATTORNEYS

Nov. 6, 1956  W. L. GOODLAD  2,769,294
PEA HARVESTER
Filed July 10, 1952  7 Sheets-Sheet 7

INVENTOR.
WILLIAM L. GOODLAD
BY
ATTORNEYS

# United States Patent Office 2,769,294
Patented Nov. 6, 1956

2,769,294

PEA HARVESTER

William L. Goodlad, New Richmond, Wis.

Application July 10, 1952, Serial No. 298,063

12 Claims. (Cl. 56—21)

This invention relates to new and useful improvements in pea harvesters of the type adapted for cutting the vine containing the pods from the ground, elevating the same to an endless conveyor, separating the peas from the vines and pods, collecting the peas in a receptacle and discharging the vines and pods.

It is an object of the present invention to povide an apparatus for the harvesting of pea vines from the ground, transporting the same over an elevator to a horizontal conveyor, separating the peas from the pods and vines and collecting the peas in a receptacle;

It is a further object of this invention to provide an apparatus for economically cutting pea vines and separating the peas therefrom which is simple of operation and may be operated by unskilled people;

It is a further object of this invention to provide a pea harvester having a construction of maximum efficiency and economy whereby peas may be harvested from the ground and collected in receptacles with a minimum of steps and in one operation;

Further objects of the present invention reside in the construction of the cutting blades, the means for elevating the same, the construction of the elevator and the rakes for progressing the vines from the ground to a horizontal conveyor and the means for separating the peas from the vines and for sorting the peas into a receptacle and the vines and pods into a discharge means, and in the specific structural features of the apparatus as hereinafter disclosed and claimed.

The invention will be described with reference to the drawings in which corresponding numerals refer to the same parts and in which.

Figure 1:
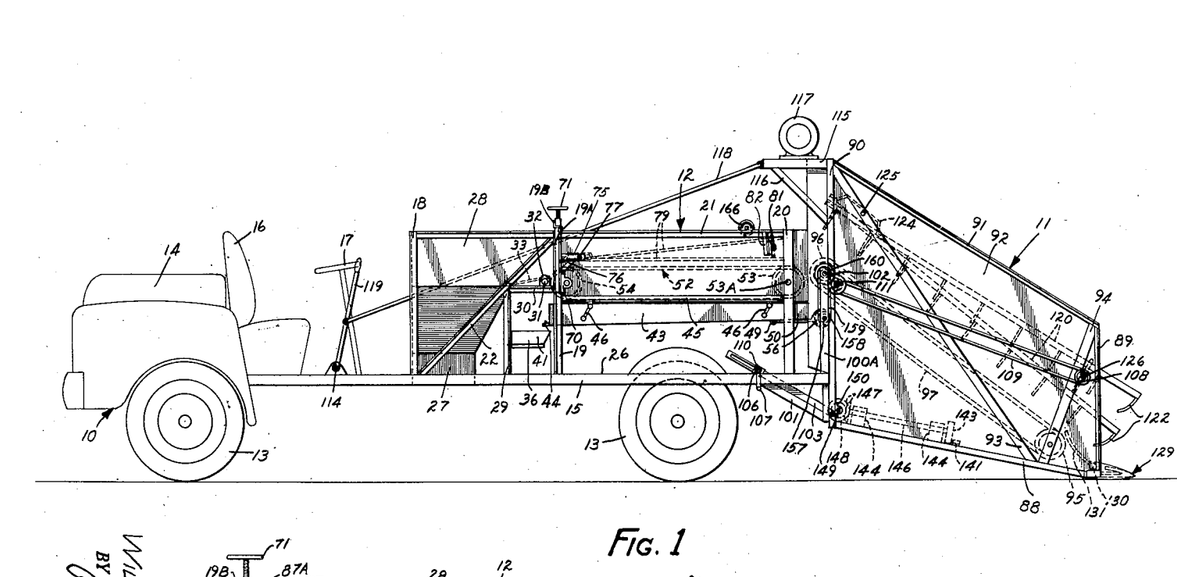
Figure 1 is a left side elevation of the instant invention.

Referring now to the drawings and particularly to Figure 1, there is shown a pea harvester mounted upon a vehicle generally designated 10. The harvester comprises a scoop or elevator, generally designated 11, and a horizontal conveyor and collector mechanism generally designated 12. The vehicle is provided with wheels 13, a combustion motor 14, as well as a longitudinal frame 15. The vehicle in the illustrated instance comprises a truck chassis on which the seat 16 has been reversed so as to face rearwardly (or rightwardly with reference to Figure 1), and the steering wheel 17 has been repositioned so as to be accessible from this modified position of the seat. However, it is of course to be understood that this feature forms no part of the invention per se, and a chassis constructed specifically for the harvester or any other conventional chassis may be employed without departing from the spirit and scope of this invention. The vehicle 10 is also provided with accelerator and clutch controls (not shown) which allow the harvester to normally move in a rightward direction with reference to Figure 1.

Horizontal conveyor and collection mechanism, generally designated 12, is supported by a framework comprising three pairs of uprights 18, 19 and 20, which are joined to the vehicle frame 15 at the bottom ends thereof and to longitudinal braces 21 at the top ends. A pair of inclined braces 22 extends from the juncture of the bottom ends of uprights 18 with frame 15 to the juncture of uprights 19 with longitudinal braces 21 to provide additional support for the conveyor. A planar floor 26 is situated on the longitudinal frame 15 as may best be seen with reference to Figure 4.

Figures 2, 9:
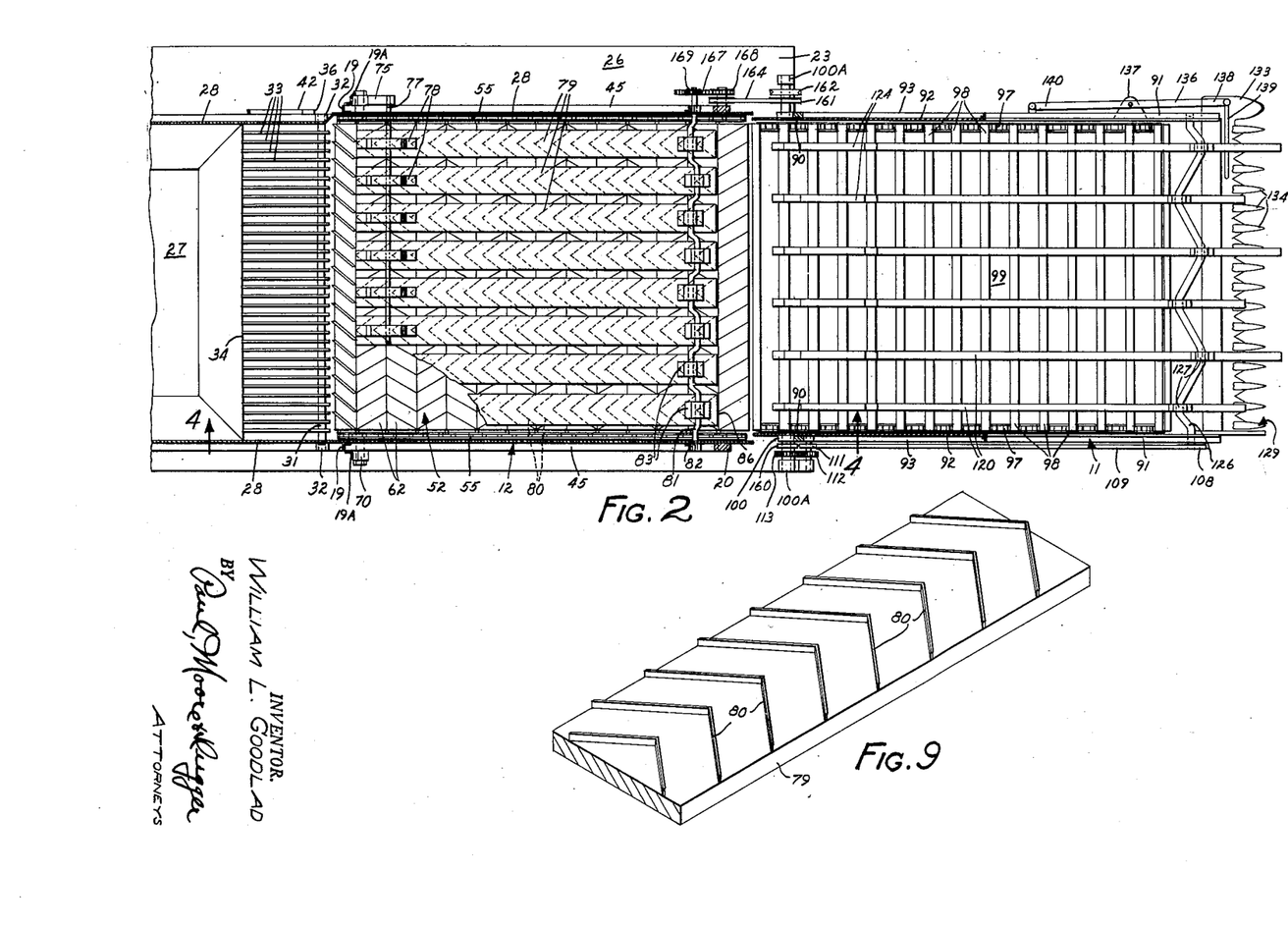
Figure 2 is an enlarged top plan view of the instant invention, partially in section, to show the details of the elevator and the horizontal conveyor.
Figure 9 is an isometric bottom view of one of the fishbacks of Figure 2.

Referring now particularly to Figure 2 it will be seen that the horizontal conveyor and collection mechanism generally designated 12 is positioned to one side of the framework consisting of frame 15 and floor 26 so that in effect a shelf or ledge 23 is provided on which one or more persons may stand to observe operations or on which a box may be placed to collect peas as they emerge from trough mouth 42 or for any other purpose.

A hopper 27 is positioned on frame 15 as shown best in Figure 1. Side plates 28, one of which is shown in Figure 1, extend from the top of the hopper 27 to braces 21 and thence from braces 18 slightly beyond braces 20 as shown best in that figure. It also extends downward from braces 21 to the top of hopper 27 and to the top of trough 43 (also shown best in Figure 1). The hopper 27 is provided with an open bottom through which the vines and pods are directed to drop in a windrow. The forward end of the hopper (rightward with reference to Figure 1) is further supported by a pair of stub braces 29 which are positioned vertically and parallel to braces 19 and which join inclined braces 22. A pair of horizontal short braces 30 serve to connect the juncture of braces 22 and 29 to braces 19.

Braces 30 serve to support a transverse rod 31 which is journalled in pillow blocks 32. Secured to rod 31 and slightly overlapping the same is a plurality of bars 33. As may best be seen with reference to Figure 2, bars 33 are supported at the opposite ends thereof on the lip 34 of hopper 27. The bars 33 are slightly spaced apart a sufficient distance to provide elongated apertures through the structure so that peas may drop therethrough and the pods will be guided thereover into the hopper 27. It may be noted with reference to Figure 1 that the bars 33 are declined slightly from right to left so as to guide the vines and pods into the hopper 27 from whence they are discharged. Bars 33 are pivotable in pillow blocks 32 in an upward or clockwise direction with reference to Figure 1. Thus, bars 33 function to allow the peas ordinarily to pass therethrough while guiding the vines and pods into hopper 27. However, should be spaces between bars 33 be clogged by vines or pods and a number of peas commence passing thereover and going into hopper 27 along with the pods and vines, bars 33 may be pivoted from the position of Figure 1 to a substantially vertical position to dislodge any vines or pods which are collected thereon and are impeding the flow of peas therethrough.

Figure 4:
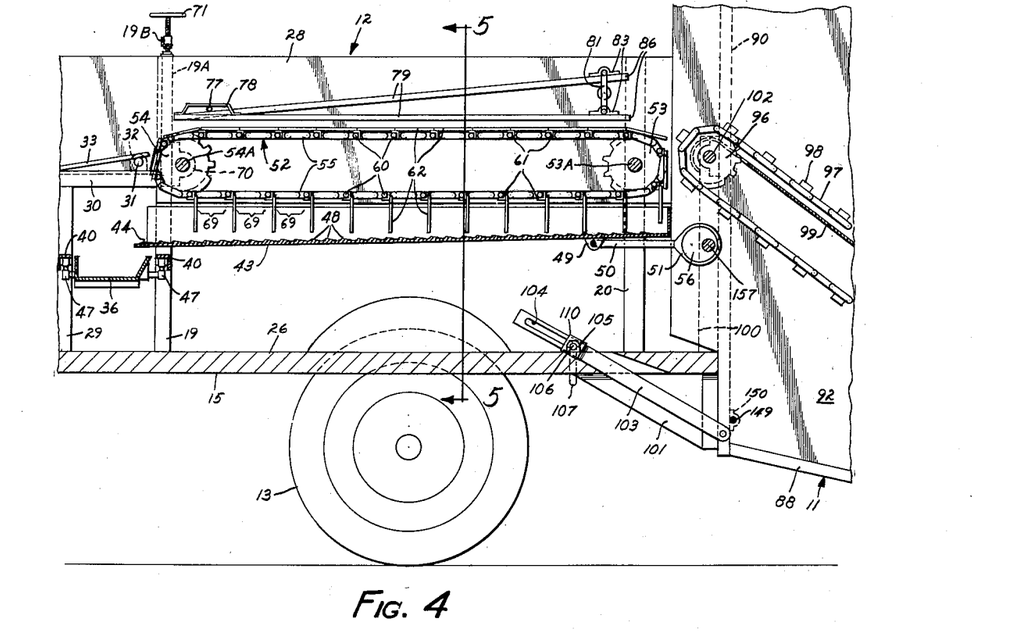
Figure 4 is an enlarged left side sectional view taken along the lines and in the direction of the arrows 4—4 of Figure 2.
Figure 13:
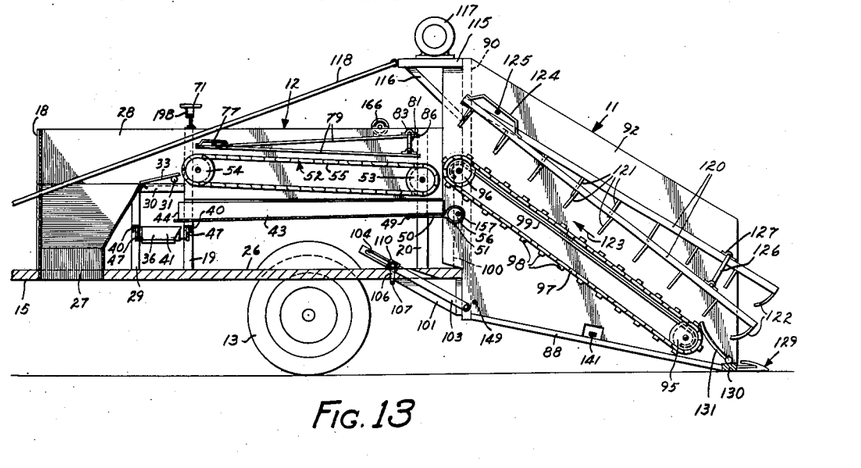
Figure 13 is a view similar to Figure 12 but showing the forward end of the horizontal conveyor in elevated position and the rearward end of the fishback rakes in depressed position.

A pea receiving trough 36 is positioned immediately beneath the bars 33 and extends across the frame 15 as is shown in Figure 1. Trough 36 is supported, as indicated in Figures 4 and 13 by a pair of transverse supports 40, one extending between upright braces 29 and the other between upright braces 19. Trough 36 is of the cross-sectional configuration shown best in Figure 4 and is provided with an end plate 41 at one end thereof and an open mouth 42 at the other end thereof as is shown best in Figure 2. Thus, the peas may be conveniently discharged from mouth 42 into any receptacle placed therebeneath. It may be noted that trough 36 is slightly inclined toward mouth 42 which inclination serves to promote the progress of the peas therealong.

Figure 5:
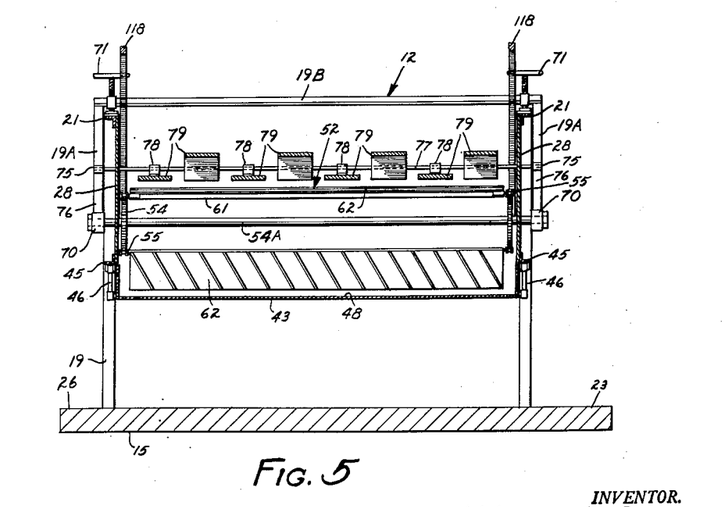
Figure 5 is a sectional view taken along the lines and in the direction of the arrows 5—5 of Figure 4.
Figure 6:
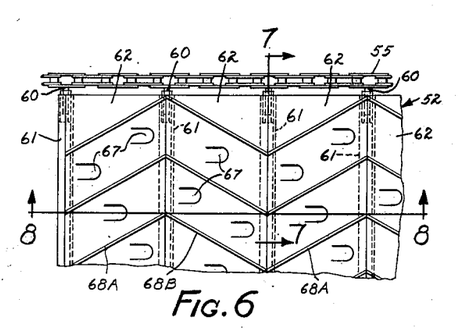
Figure 6 is a fragmentary top plan view of one of the harvester conveyor belts.

A second trough 43 is positioned as to discharge peas from mouth 44 into trough 36 as is best shown with reference to Figure 1. Trough 43 is supported from longitudinal braces 45 by links 46 (see Figures 5 and 11), which are similar to links 47 for trough 36. Links 46 have one end pivotally attached to trough 43 and the other end pivotally attached to braces 45. As may best be seen with reference to Figure 4, trough 43 is slightly inclined toward mouth 44, and reciprocates longitudinally. The floor of trough 43 is provided with a corrugated surface 48 over which the peas roll on their way to trough 36. Thus, the slight inclination of trough 43 and the reciprocatory motion thereof together with the corrugations insure that the peas will be progressed uniformly from right to left to be delivered into trough 36.

Secured to the underside of trough 43 is a boss 49 to which is pivotally attached a link 50 of reciprocatory frame 51. Reciprocatory frame 51 is reciprocated by eccentric cam 56 on shaft 157, for the reciprocation of trough 43 as will be more fully explained hereinafter.

Figure 7:
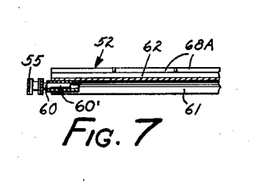
Figure 7 is a sectional view taken along the lines and in the direction of the arrows 7—7 of Figure 6.
Figure 8:
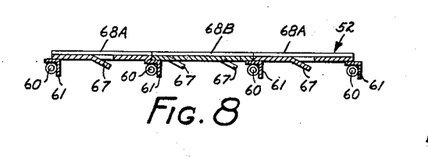
Figure 8 is a sectional view taken along the lines and in the direction of the arrows 8—8 of Figure 7.

Positioned immediately above trough 43 is an endless conveyor generally designated 52 which is supported by a pair of drive sprockets 53 and a pair of driven sprockets 54. Sprockets 53 and 54 serve to support a pair of endless chains 55 shown in Figure 2. Anchored to chains 55 is a plurality of studs 60 which are journalled in tubular bearings 60' attached to angle members 61 which support segments 62 as may best be seen with reference to Figure 7 in conjunction with Figure 4. Thus, the endless conveyor 52 comprises a plurality of transverse segments 62 to each of which is secured an angle member 61 at its forward edge by welding or otherwise affixing. Thus, the forward edge of each segment is supported by an angle member 61 and rearward edge rests upon the forward lip of a second angle member 61 for the next succeeding segment 62. Hence, each segment 62 is supported at the forward end thereof by being securely affixed to one angle member 61 and at the rearward end by resting upon the horizontal flange of the next angle member 61. Each segment is free to pivot with respect to stud 60 and consequently after having passed over driven pulley 54 will depend as shown in Figure 4, thus providing a plurality of apertures 69 between the endless chains 55.

Each one of the segments 62 is provided with a plurality of depressed portions 67 which form apertures in the segments through which peas may pass and with a plurality of angled linear projections 68A and 68B. It may be noted that the angle of linear projections 68A is inclined with respect to the angle of linear projection 68B so that a series of V's or a fishback pattern is provided. Thus, it may be seen with reference to Figures 4, 6, 7 and 8, that the peas may fall through depressions 67 and through apertures 69 onto corrugated surface 48 of trough 43.

Each of the driven sprockets 54 is rotatably mounted on a common shaft 54A, the ends of which are in pillow blocks 70 mounted on uprights 19A which are attached to horizontal brace 19B. A conventional handlewheel 71 is affixed to braces 21 for raising and lowering pillow blocks 70 by elevating and depressing uprights 19A to raise and lower the drive sprockets 53 so as to vary the incline of endless conveyor 52, and correspondingly of rakes 79 as may be seen in Figure 5.

Extending from uprights 19 is a pair of strap braces 75 each of which is provided with a support brace 76. Extending between braces 75 is a rod 77 which supports the sliders 78 of a plurality of fishback rakes or rake bars 79, as may be seen best with reference to Figures 2 and 4. Fishback rakes 79 are comprised of a plurality of longitudinally planar members each provided on the underside thereof with a series of chevron-shaped projections 80 as is seen best in Figure 9. A crankshaft 81 is provided, supported by a pair of braces 82 suspended from longitudinal braces 21 as seen in Figure 1, and each rake 79 is secured to the crankshaft by bearing blocks 83. It will be seen, as illustrated best in Figures 2 and 4, that alternate pairs of rakes 79 will be sequentially elevated and depressed to compress peas and vines between the projections 80 of rakes 79 and the projections 68A and 68B of endless conveyor 52. Projections 68A and 68B form chevron projections which are at right angles to the chevron projections 80 of rakes 79. Thus, the forward end 86 of each of the rakes 79 will travel in a circle, clockwise with reference to Figure 1, and the pods will be caught and ground between projections 80 and projections 68A and 68B to abrade them from the peas.

Figure 14:
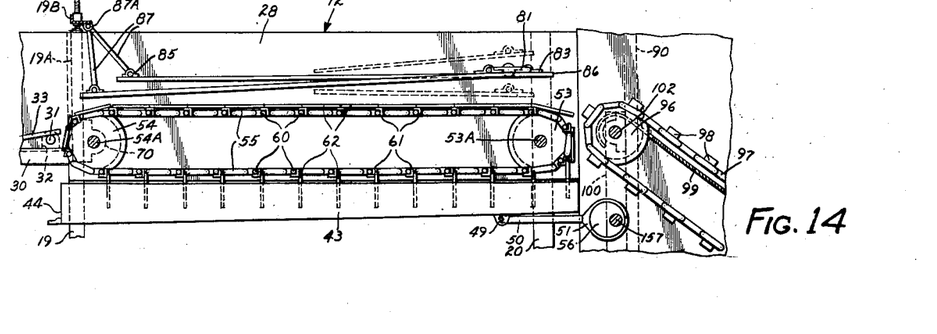
Figure 14 is a view similar to Figure 4 but showing a modified form of the fishback rakes of Figures 12 and 13.

In the modification of the fishback rakes shown in Figure 14, rod 77 and sliders 78 of rakes 79 are omitted. Instead, each of rakes 79 is provided with a bearing block 85 to which is pivotally attached connecting rod 87 which is pivoted at its other end to the bearing block 87A secured to brace 19B as may be seen with reference to Figure 14. Thus, in the modification shown in Figure 14, each individual rake will assume the position shown by the lower full line rake 79 then advance to the position indicated by the upper dotted line position then assume the position shown by the upper full line position from whence it will descend to the position shown by the lower dotted line position and then return to the lower full line position as the crankshaft 81 is rotated. Thus, it will be seen that the ends of the rakes 79 adjacent braces 19A will cyclically lift forwardly and descend rearwardly as crankshaft 81 is rotated for scraping the vines between rakes 79 and endless conveyor 42. This provides somewhat more of a jamming and abrading action than does the modification of Figures 1–13.

The slide support braces 75, it may be noted at this time, are connected to the hand wheels 71 and are raised and lowered as are pillow blocks 70 for driven sprockets 54.

Positioned immediately on the forward edge of the vehicle (right edge with reference to Figure 1) is a pair of upright braces 100 which serve to pivotally support the scoop generally designated 11. Scoop 11 comprises a frame composed of a pair of angle braces 88 joined to the lower ends of a pair of uprights 89 and a second pair of uprights 90. The upper ends of uprights 90 are joined to a pair of declined braces 91, the frame 88—91 being provided with a pair of sides 92 and a bottom therefor. Joined to braces 90 and 88 is a pair of inclined angle braces 93 as may be seen with reference to Figure 1. A pair of idler shaft supporting braces 94 is joined to braces 91 and 88 also, as is seen in Figure 1. Supported on braces 94 is an idler roller 95 and supported on braces 100 by shaft 102 is a drive roller 96. An endless conveyor 97 is supported between idler roller 95 and drive roller 96. Endless conveyor 97 is of the construction best shown in Figures 12 and 13 and is provided with a plurality of transverse cleats 98 extending thereacross.

Beneath the top run of endless conveyor 97 there is placed a piece of sheet metal 99 which help to keep the peas and vines from falling to the ground.

Figure 10:
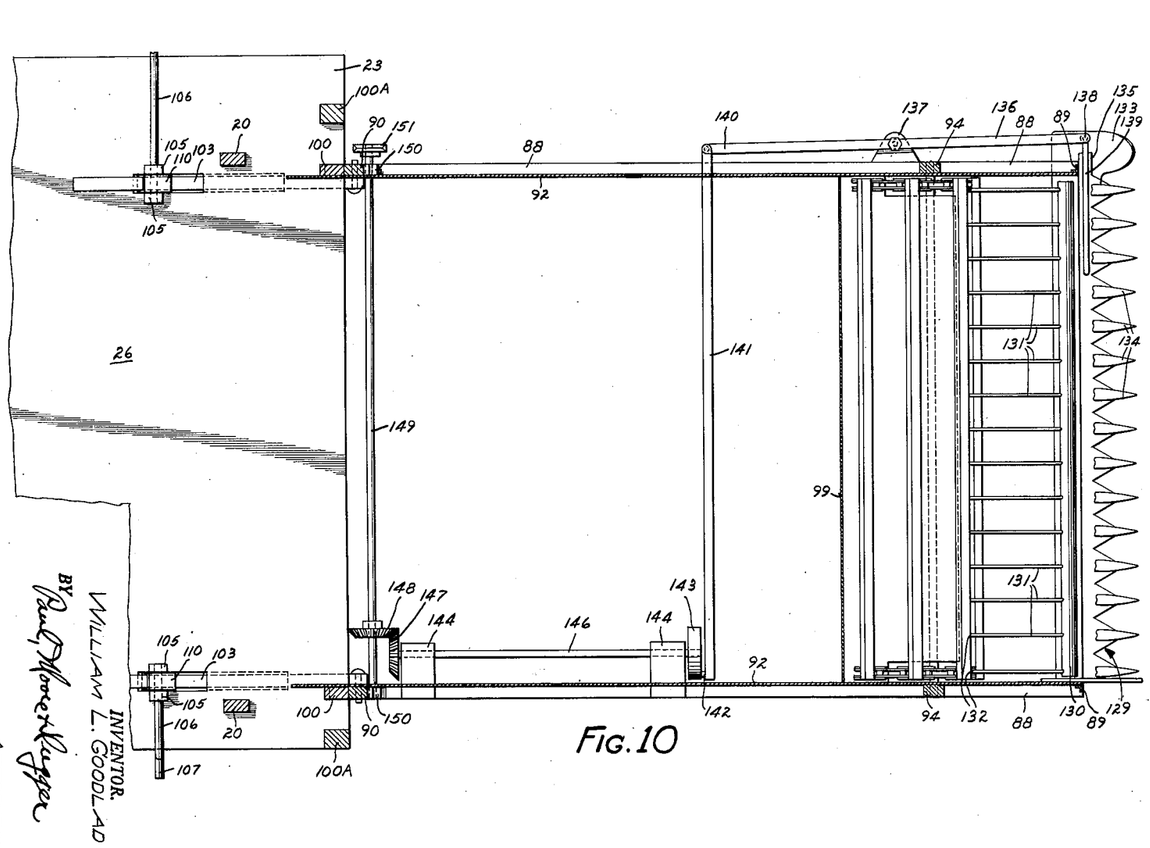
Figure 10 is a horizontal sectional view taken along the lines and in the direction of the arrows 10—10 of Figure 3.
Figure 11:
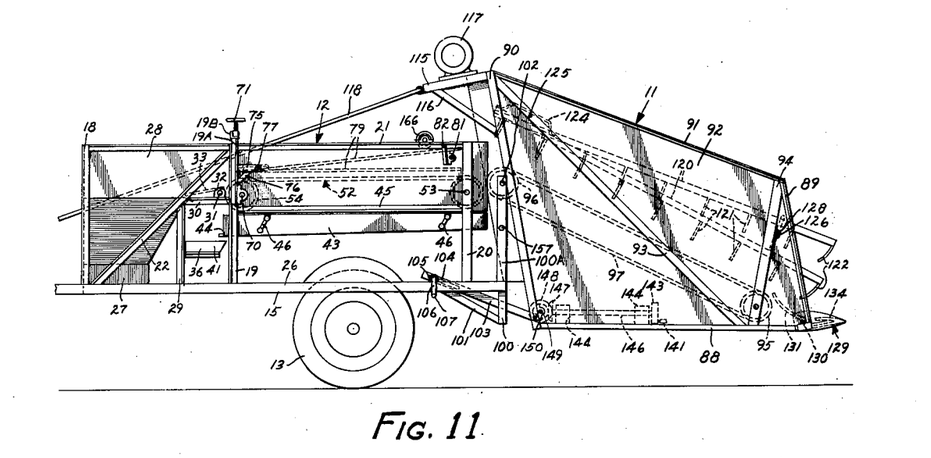
Figure 11 is a left side elevation of the instant invention showing the scoop in elevated position.

Upright braces 100, which are provided with angle supporting braces 101, are secured to the protruding end of frame 15 as may be seen with reference to Figure 11. These braces 100, not only serve to support the drive roller 96 as mentioned previously, but also support shaft 102 about which the scoop 11 pivots as may best be seen with reference to Figure 11. Upright braces 100A, which are best seen in Figure 10, are parallel to but exterior of braces 100 and also serve to support shaft 102.

At the rearward end of the scoop 11 is pivotally attached restraining members 103 which are provided with slots 104 therein (only one of which is shown in Figure 11). One of each of these members 103 it attached to an opposite rear corner of scoop 11. A pair of bosses 105, one of which is shown in Figure 4, serve to support shafts 106 having handles 107 on the end thereof. For each of the restraining members 103, there is provided a slider 110. Each of the sliders 110 has positioned within it a cam, not shown, which operates as handle 107 is turned from a vertical to a horizontal position to frictionally engage the sides of the slot 104 to position the same immovably in any position, as is well known. Thus, the scoop 11 is free to pivot about shaft 102 and may be maintained in the elevated position of Figure 11 or any other elevated position by turning the handle 107 so that the cams of sliders 110 frictionally engage slot 104. Thus, the scoop 11 may pivot about the axis 102 to follow the contour of the land during the cutting operations or for any other purpose.

Figure 12:
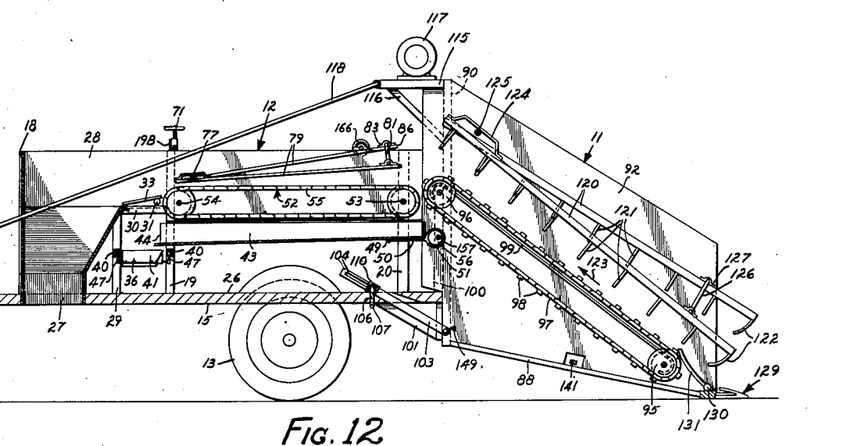
Figure 12 is a sectional view similar to Figure 11 but showing the scoop in ground engaging position and showing the forward end of the horizontal conveyor in datum position and the rearward end of the fishback rakes in elevated position.

A platform 115 is positioned on the top rearward end of scoop 11 and is additionally supported by a pair of braces 116. Positioned on this platform is an electric motor 117 which may be driven by any suitable supply source. A Y-shaped control rod 118 has its extending ends pivotally secured to the corners of platform 115 and its stem end to elevator lever 119 for the elevation or depression of the scoop 11 as shown in Figures 1 and 12–13. Elevator lever 119 is pivoted at 114 to the chassis 15.

Disposed above endless conveyor 97 is a plurality of rakebars 120. Rakebars 120 are longitudinally disposed above the endless conveyor 97 and are provided with a plurality of depending picks 121. Rakebars 120 are also provided with end picker members 122 which are curved in the direction of travel of endless conveyor 97 as exemplified by the arrow 123. Bars 120 are each provided with a slide 124 at the upward end thereof which is reciprocable on a transverse 125 which is supported adjacent the upper end of frame members 93. A crankshaft 126 is provided and is affixed to a pillow block 127 on each one of rakebars 120. The ends of the crankshaft are journalled for rotation in a pair of pillow blocks 128 affixed to frame members 94. As may best be seen with reference to Figures 1, and 11–13, alternate pairs of rakebars 120 reciprocate in a clockwise circle to pull the vines and pods in the direction of arrow 123 thus cooperating with the direction of travel of the belt also indicated by arrow 123.

Positioned on crankshaft 126 is a sheave 108 which is driven by sheave 111 through V-belt 109. Sheave 111 is driven by the gear 112, which is placed on the same shaft of sheave 111. Gear 112 meshes with gear 113 which is on shaft 102 and thus rotation of shaft 102 drives crankshaft 126.

Referring now particularly to Figures 10–13, at the mouth end of the scoop, there is provided a sickle bar generally designated 129 to which, as shown best in Figure 10, there is welded or otherwise affixed, a bar member 130 supporting a plurality of flexible steel tines 131, the exterior end 132 of which rests upon the transverse projections 98 of endless conveyor 97. As shown specifically in Figures 11–13, the tines 131 are slightly concave so as to guide vines cut by the sickle bar 129 up onto conveyor 98, where, by the action of the conveyor and the cooperative action of the rakes 120 they are conveyed upward in the direction of arrow 123 and then onto the endless longitudinal conveyor 52.

The sickle bar 129 is of a type generally known in the industry and forms no part of this invention. It is provided with a guide shoe 133 and a plurality of stationary teeth 134. A reciprocal member 135 is reciprocated by rocker arm 136 which is pivoted upon boss 137. One end 138 of rocker arm 136 is affixed to a connecting arm 139 attached to reciprocal member 135. The other end 140 of rocker arm 136 is attached to an extending connecting arm 141 which is attached by a stud 142 to a flywheel 143. Flywheel 143 is journalled in pillow blocks 144 mounted upon scoop 11 as shown in Figures 1 and 10 and is driven by a shaft 146 which is rotated by bevel gear 147. A mating bevel gear 148 is journalled on shaft 149 which is in turn journalled in bearings 150 on the scoop 11 as is shown best in Figure 10.

Figure 3:
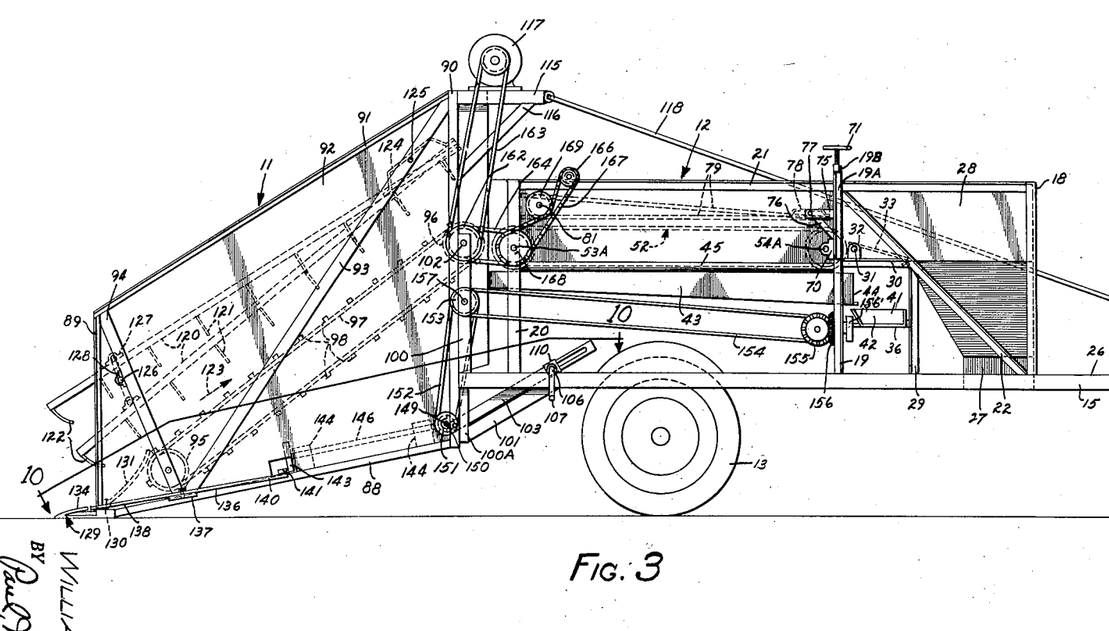
Figure 3 is a right side elevation showing particularly the drive for the elevator and horizontal conveyors.

Affixed to the extending end of shaft 149 is a sheave 151 driven by belt 152 from sheave 153. Rotation of sheave 151 thus actuates sickle bar 129 for cutting. Sheave 153 is a dual sheave and is also connected by belt 154 to drive a bevel gear 155 which in turn drives a mating bevel gear 156 which drives an eccentric cam 156' to reciprocate trough 36 by means of a reciprocatory frame and link which are not shown in detail, but are exactly similar to reciprocatory frame 51 and link 50 for trough 43. The shaft 157 of sheave 153 is journalled in braces 100 and 100A and traverses the distance therebetween. Disposed on the opposite end of shaft 157 is eccentric cam 56 which operates in reciprocatory frame 51 to reciprocate trough 43 forwardly and backwardly. Also attached to the opposite end of shaft 157 is a sheave 158 which is driven through belt 159 by sheave 160. Roller 96 of endless belt 97 which travels in the direction of the arrow 123, is also driven by sheave 160. This is best shown with reference to Figures 1 and 3. Shaft 102 of sheave 160 extends between frame members 100 and 100A and adjacent the opposite end thereof is provided with a dual sheave 161—162. Sheave 162 is driven by a belt 163 from motor 117 as is best shown in Figure 3. The rotation of sheave 162 by means of belt 164 drives the chain sprockets 53 of endless conveyor 52. Also rotated by belt 164 is sprocket 168 positioned on shaft 53A which drives chain 167 which is passed around an idler sprocket 166 positioned on one of the frame members 21 as shown in Figure 3. Thus, sprocket 168 and idler sprocket 166 are positioned so that the chain 167 bears against the teeth of sprocket 169 for rakebars 79 and thus the rakebars 79 are reciprocated in a counterclockwise direction with reference to Figure 3.

With reference to the driving connections, as explained above, it will therefore be apparent that energization of the motor 117 simultaneously activates endless conveyors 52 and 97, the fishback rakes 79 and the bar rakes 120 as well as reciprocating the troughs 36 and 43 and the reciprocatory member 135 of the sickle bar 129.

Thus, in operation, the harvester 10 will be moved in a direction from left to right with reference to Figure 1, the sickle bar 129 will engage the vines and pods and sever them from the ground whereupon they will be guided by tines 130 onto endless conveyor 97, whereupon the action of conveyor 97 and bar rakes 120 will progress the pods and vines in the direction of arrow 123. The pod containing vines will then be delivered onto endless conveyor 52 and will be abraded between conveyor 52 and fishback rakes 79, whereupon the peas will be separated from the pods and fall through apertures 67 of conveyor 52 into reciprocatory trough 43 whereupon they will be guided into reciprocatory trough 36 from whence they will emerge for collection. The vines will be progressed along endless conveyor 52 and over bars 33 into hopper 27. Any peas which have not fallen through into reciprocatory trough 43 will fall through bars 33 into reciprocatory trough 36.

As many widely differing embodiments of this invention may be made without departing from the spirit and scope thereof, it is to be understood that I do not limit myself to the specific embodiment disclosed herein.

What I claim is:

1. An apparatus for harvesting peas and the like having a wheeled frame, a cutting means on said frame and positioned to engage vines substantially close to the surface of the ground for the cutting thereof, an endless conveyor positioned adjacent said cutting means for elevating said vines, said endless conveyor having a terminal end positioned to discharge said vines into a threshing apparatus comprising in combination a second endless conveyor, said second endless conveyor having a plurality of depressions forming apertures therethrough, a plurality of linear projections extending at inclined angles adjacent said apertures, a plurality of spaced reciprocatory rake members located above said second endless conveyor for compacting the vines and peas between said members and said endless conveyor, a trough located beneath said second endless conveyor having a discharge end for discharge into a second trough, said second trough having a discharge end, guide means positioned above said second trough and adjacent the discharge end of said second conveyor for guiding vines and pods thereover, said guide means having a plurality of apertures therethrough, a hopper for collecting said vines and pods from said second endless conveyor, and motor means for driving said first and second conveyors, said cutter, said rakes, said reciprocatory members simultaneously.

2. The apparatus of claim 1 further characterized by means for elevating and lowering an end of said second endless conveyor and said reciprocatory members disposed thereover.

3. In an apparatus for harvesting peas and the like having a cutting means positioned to engage vines substantially close to the surface of the ground for the cutting thereof, an elevator means positioned adjacent said cutting means for elevating said vines, the improvement comprising in combination an endless conveyor, said endless conveyor having a plurality of apertures therethrough, linear projections adjacent said apertures a plurality of spaced alternately reciprocatory members located above said endless conveyor for compacting the vines and peas between said members and said endless conveyor, a reciprocatory trough located beneath said endless conveyor having a discharge end for discharge into a second reciprocatory trough and said second reciprocatory trough reciprocal in a longitudinal direction also having a discharge end, guide means positioned above said second reciprocatory trough and adjacent the discharge end of said endless conveyor for guiding vines and pods thereover, said guide means having a plurality of apertures therein and a hopper for collecting said vines and pods on the side of said guide means remote from said conveyor, and motor means for driving said first and second endless conveyors, said cutter, said reciprocatory members and said reciprocatory troughs simultaneously.

4. The subcombinaton for threshing a hulled vegetable comprising an endless conveyor positioned in a horizontal position substantially above the surface of the ground, means supporting said endless conveyor, said endless conveyor having a plurality of apertures therein, a plurality of spaced linear projections on said endless conveyor positioned at an inclined angle with respect to each other, a plurality of reciprocating rake bars supported above said endless conveyor, a plurality of projections on said reciprocating rake bars adapted for cooperation with said plurality of projections on said endless conveyor, a reciprocal trough positioned beneath said endless conveyor and having a discharge end positioned over a second reciprocal trough, a guide positioned adjacent the discharge end of said endless conveyor, having a plurality of apertures therein, said second reciprocal trough positioned therebeneath, a hopper positioned adjacent said guide and adapted to receive pods and vines progressed over said second endless conveyor and said guide, and means for simultaneously actuating said cutter bar said endless conveyor said reciprocating rake bars and said reciprocating troughs.

5. In combination with a pea harvester or the like, an endless conveyor having a receiving end and a discharge end, means supporting said endless conveyor in a horizontal position substantially above the surface of the ground, said endless conveyor having a plurality of apertures therein, a plurality of linear projections on said endless conveyor, a plurality of reciprocating rake bars positioned above said second endless conveyor, a plurality of projections on said reciprocating rake bars adapted for cooperation with said plurality of projections on said second endless conveyor, a longitudinally reciprocal trough positioned beneath the lower run of said second endless conveyor and having a discharge end positioned over a second longitudinally reciprocal trough, a guide positioned adjacent the discharge end of said endless conveyor and said second longitudinally reciprocal trough positioned therebeneath, and a hopper positioned next to said guide and adapted to receive pods and vines progressed over said second endless conveyor said guide and into said hopper, and means for simultaneously actuating said endless conveyor, and said reciprocating rake bars and said reciprocating troughs.

6. The subcombination for harvesting peas comprising horizontal conveyor means for receiving and conveying vines, a plurality of misaligned depressions and apertures in said conveyor means, angularly inclined linear projections adjacent said depressions, means positioned above said horizontal conveyor means for compacting and abrading the vines and pods therebetween for separating the peas from the pods, means disposed beneath said horizontal conveyor means for receiving said peas and means at one end thereof for separately collecting said vines and pods, and means for simultaneously elevating the discharge ends of said horizontal conveyor and said abrading means.

7. In an appaaratus for harvesting peas and the like having in combination a wheeled frame, motor means connected thereto for progressing said frame along the ground, a cutting means associated with said frame and positioned to engage pod containing vines substantially close to the surface of the ground for the cutting thereof, elevator means positioned adjacent said cutting means for elevating said vines, a threshing apparatus comprising horizontal conveyor means mounted to receive said elevated vines from said elevator means, said horizontal conveyor means having a plurality of apertures therein, linear inclined projections adjacent said apertures, abrading means positioned above said horizontal conveyor means for compacting and abrading the vines and pods therebetween for separating the peas from the pods, and receiving means disposed beneath said horizontal conveyor means for receiving said peas and means for separately collecting said vines and pods.

8. A separator comprising in combination a horizontal conveyor means for receiving vines comprising a pair of endless chain members having transverse connecting members therebetween and a plurality of transverse plate members each secured at one edge to one of said transverse connecting members and resting at the other edge on a succeeding one of said transverse connecting members, apertures in said plates, bar means positioned above said horizontal conveyor means for compacting and abrading the vines and pods therebetween for separating the peas from the pods, said transverse plate members having apertures therein and means disposed beneath said horizontal conveyor means for receiving said peas and means disposed at one end of said horizontal conveyor means for separately collecting said vines and pods.

9. In an apparatus for harvesting peas and the like including a wheeled frame, cutting means supported by said frame and positioned to engage pod-containing vines substantially close to the surface of the ground for the cutting thereof and elevator means positioned on said frame adjacent said cutting means for elevating said vines to a receiving means, a harvester comprising in combination means positioned on said frame for supporting said elevated vines, means positioned on said frame above said supporting means for compacting and abrading the vines and pods therebetween for separating the peas from the pods, means disposed on the frame beneath said supporting means for collecting said peas, and means positioned on the frame at one end of said supporting means for separately collecting said vines and pods, the supporting means comprising a horizontal conveyor having an upper and a lower run and a receiving end and a discharge end, said conveyor being provided with a plurality of apertures, linear projections adjacent said apertures, and said conveyor comprised of a plurality of transverse sections pivoted at one side thereof to endless supporting members.

10. In a pea harvester or the like having means for cutting pod containing vines, initial means for conveying said pod conveying vines to a separating means, and means for separately receiving the peas and vines after they have passed through said separating means, the improvement comprising in combination a horizontal endless conveyor positioned to receive said cut vines, said conveyor being provided with a plurality of apertures, longitudinal projections adjacent said apertures, abrading means positioned above the upper run of said endless conveyor, through means positioned beneath the lower run of said endless conveyor and collection means positioned to receive vines as they are discharged from said endless conveyor.

11. The apparatus of claim 10 further characterized in that said horizontal endless conveyor has an initial end positioned beneath said initial means for conveying said pod conveying vines, a terminal end positioned to discharge vines into said collection means, means for driving said endless conveyor in a direction from said initial end to said terminal end and a plurality of pairs of longitudinal projections on said endless conveyor, said longitudinal projections forming an endless course alternately angled toward opposing sides of said endless conveyor.

12. The apparatus of claim 11 further characterized by said abrading means being above the upper run of said endless conveyor and comprising a plurality of adjacent rows of alternate reciprocating abrading elements longitudinally extending and having one end of each row of abrading elements positioned adjacent said terminal end of said conveyor and the other end of each row of abrading elements positioned adjacent the initial end of said conveyor and means for simultaneously adjusting the elevation of the discharge end of said conveyor and the end of said abrading means associated therewith.

References Cited in the file of this patent

UNITED STATES PATENTS

| | | |
|---|---|---|
| 193,866 | Gordon et al. | Aug. 7, 1877 |
| 754,394 | Silvis | Mar. 8, 1904 |
| 1,874,916 | Culver | Aug. 30, 1932 |
| 1,935,803 | Lilliston | Nov. 21, 1933 |
| 2,504,193 | Gough et al. | Apr. 18, 1950 |
| 2,524,077 | Porter | Oct. 3, 1950 |
| 2,587,289 | Cook | Feb. 26, 1952 |
| 2,597,673 | Ritter et al. | May 20, 1952 |
| 2,608,973 | Coons | Sept. 2, 1952 |